C. HOFF.
PRITCH.
APPLICATION FILED JULY 8, 1912.
1,054,770.
Patented Mar. 4, 1913.
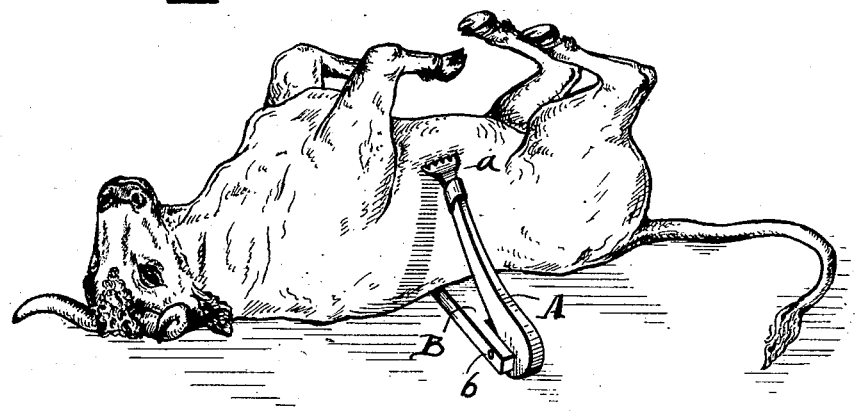
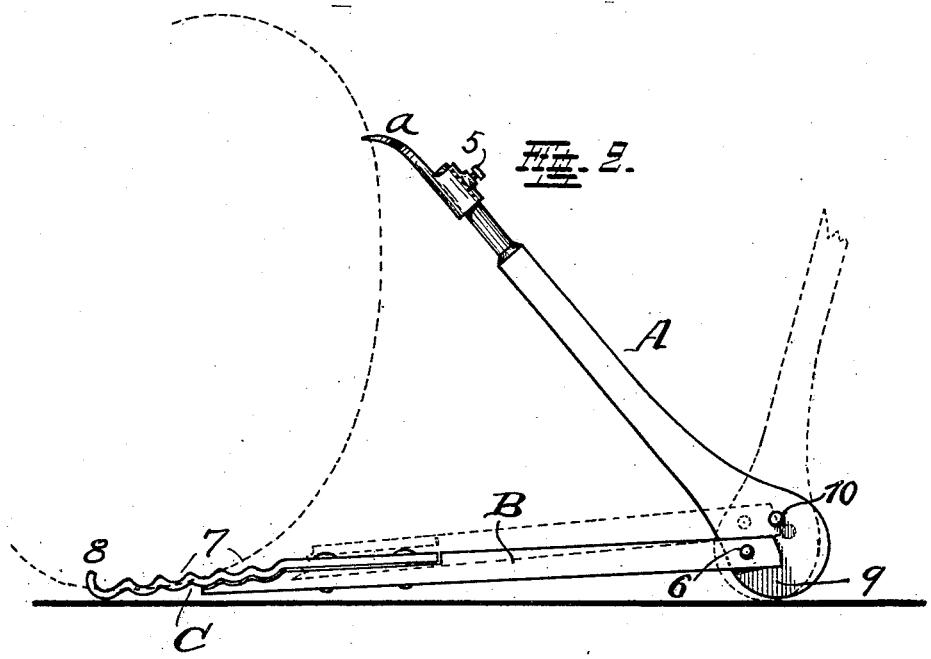
Witnesses.
M. P. Blackburn.
T. LeBeau.
Inventor.
Charles Hoff
by C. Spengel atty

UNITED STATES PATENT OFFICE.

CHARLES HOFF, OF CINCINNATI, OHIO.

PRITCH.

1,054,770. Specification of Letters Patent. Patented Mar. 4, 1913.

Application filed July 8, 1912. Serial No. 708,128.

*To all whom it may concern:*

Be it known that I, CHARLES HOFF, a citizen of the United States, and a resident of Cincinnati, Hamilton county, State of Ohio, have invented certain new and useful Improvements in Pritches; and I do declare the following to be a clear, full, and exact description of the invention, attention being called to the drawing which accompanies this application and forms a part thereof.

This invention concerns pritches, an implement used in beef-killing establishments where it serves to hold a carcass in a certain position upon the killing floor and with its abdomen uppermost to facilitate the procedure of certain operations connected with the skinning and dressing of the same.

The leading feature of the invention is a construction which permits part of the weight of the carcass to be utilized for the purpose of holding the implement in position independent of attachment to the floor or any positive engagement therewith.

In the following specification and particularly pointed out in the claims at the end thereof will be found a full description of my invention, together with its manner of use, parts and construction, which latter is also illustrated in the accompanying drawing, in which:—

Figure 1, shows my implement in perspective view, illustrating the manner of its use. Fig. 2, is an enlarged side-elevation of the same.

As to its function the implement constitutes substantially a prop which, while supported at one of its ends and in an inclined position, engages at its other end the carcass while the same leans sidewise against it, all as best shown in the drawing. In this latter the prop is indicated at A, its free end being arranged to facilitate engagement with the hide of the carcass. For such purpose a serrated claw $a$ is used which may be permanently connected as shown in Fig. 1, or connected so as to be adjustable as shown in Fig. 2. A suitable form of adjustment is by means of a set-screw 5. For the purpose of holding this prop in position, a base B is provided to which it is attached by a hinge-connection of which 6 forms the pivot. This base is elongated sufficiently to permit engagement of it at its free end by the carcass in a manner best shown in Fig. 2, whereby the weight of the latter is utilized to retain the implement in position.

The implement is positioned by leaning the carcass first in a position opposite to that shown, to permit the free end of the base to be shoved under the back of the carcass, which is then turned over in the opposite direction, so as to roll upon the base and to fall at the same time against the claw of the prop, which is held by the butcher in the required position until engaged by the carcass. It will now be readily seen that the implement cannot slip away since part of the carcass by resting on it serves to hold it independent of any positive engagement with the floor, which, especially in case this latter consists of concrete for instance, would not be feasible. By preference the end-portion of the base so engaged by the carcass is corrugated as shown at 7, and turned up at its end as shown at 8, to render the engagement more secure. The end-portion is preferably made of a piece of metal C, to be attached to the base, especially in case the latter is made of wood.

To render the engagement of the claw with the carcass more secure, I devise the construction in a manner which imparts an action to the former whereby the same is positively forced against the carcass. This is obtained by extending the end of the prop below the base as best shown at 9 in Fig. 2, the pivot by preference being seated eccentrically as to the prop. In this manner the lower end of the prop is seated directly upon the floor and part of the action of the weight of the carcass upon the base is transferred upon the prop by means of pivot 6.

A stop 10 is provided which prevents the two members A and B from moving apart farther than shown in dotted lines in Fig. 2, a condition which would be undesirable because making the handling of the implement inconvenient for positioning or while moving it about.

Having described my invention, I claim as new:

1. A pritch consisting of a prop provided with carcass-engaging means at one of its ends, a base adapted to be engaged at one of its ends by a carcass and a pivot connecting the other end of the base to the prop between the ends thereof.

2. A pritch consisting of a prop provided with carcass-engaging means at one of its ends and adapted to assume an inclined position, while resting upon its other end, a base adapted to be engaged by the weight of a carcass and means whereby said base is connected at one of its ends to the prop between the ends thereof.

In testimony whereof, I hereunto affix my signature in the presence of two witnesses.

CHARLES HOFF.

Witnesses:
C. SPENGEL,
T. LE BEAU.

Copies of this patent may be obtained for five cents each, by addressing the "Commissioner of Patents, Washington, D. C."